May 12, 1953     J. H. CRUMBLE     2,638,359
MANUALLY ENERGIZED AND SPRING OPERATED BICYCLE Filed July 26, 1950     4 Sheets-Sheet 1

Fig. 1

INVENTOR.
JAMES H. CRUMBLE

BY

ATTORNEY

May 12, 1953      J. H. CRUMBLE      2,638,359
MANUALLY ENERGIZED AND SPRING OPERATED BICYCLE
Filed July 26, 1950      4 Sheets-Sheet 2

JAMES H. CRUMBLE
INVENTOR.

ATTORNEY

Patented May 12, 1953

2,638,359

UNITED STATES PATENT OFFICE 2,638,359

MANUALLY ENERGIZED AND SPRING OPERATED BICYCLE

James H. Crumble, Brooklyn, N. Y., assignor to Carva Ventures, Incorporated, New York, N. Y., a corporation of New York Application July 26, 1950, Serial No. 175,948

7 Claims. (Cl. 280—215)

This invention relates to bicycles, and similar wheeled vehicles, which are normally manually operated by foot-pedals, or other suitable means.

The invention represents an improvement over the "Vehicle," disclosed in Patent Number 2,277,391, and Patent Number 2,384,728, which were issued to me on March 24, 1942, and September 11, 1945, respectively.

In Patent Number 2,277,391, a spring winding mechanism is shown, attached to a bicycle, the spring being wound by means of the pedals, the energy stored in the spring being utilized to propel the vehicle, when the foot pedals are released.

In Patent Number 2,384,728, a bevel gear rear axle drive together with a bevel gear reduction gear transmission, which is connected to the rear axle drive pinion, are introduced to enable the momentum of the rear wheels, in travelling downhill, to wind the spring and store the energy for use in propelling the vehicle, after the bottom of the hill is reached.

The object of the invention is to combine the advantages of the construction, shown in the above patents, and to simplify the apparatus required to perform such functions.

A further object is to provide an apparatus, which can be attached to the frame and operating mechanism of the conventional type of bicycle, thereby sharply reducing the weight and cost of the complete vehicle.

A further object is to provide a pedal control linkage, by means of which the pedals at both sides of the bicycle, are interconnected in such a manner as to enable the operator to obtain maximum mechanical advantage during each pedal stroke.

The accompanying drawings, illustrative of one embodiment of my invention, together with the description of its construction and the method of operation and utilization thereof, will serve to clarify further objects and advantages of my invention.

It will be understood that the following description of the construction and operation of the manually energized, spring operated bicycle, is intended as explanatory of the invention and not restrictive thereof.

In the drawings, the same reference numerals designate the same parts throughout the various views, except where otherwise indicated.

Figure 1:
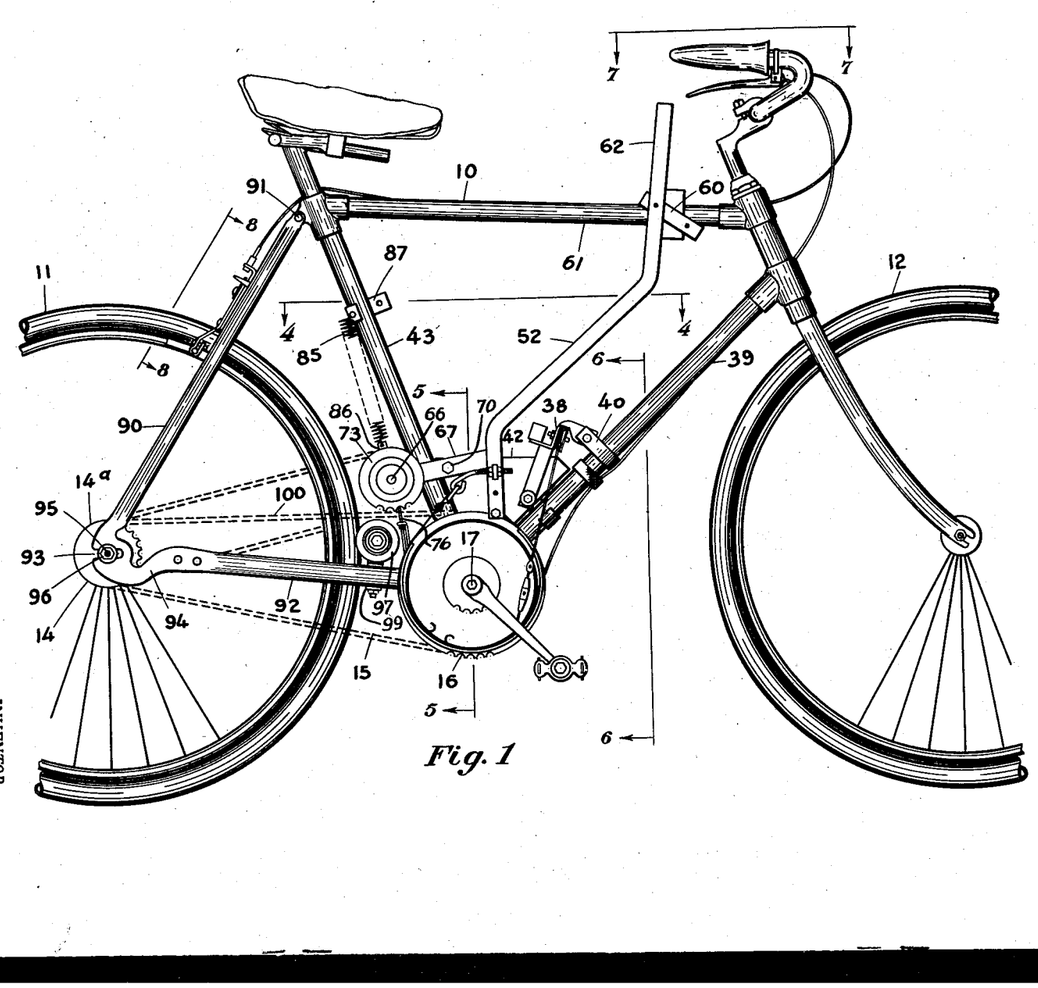
Fig. 1 represents a side elevation of the assembled bicycle, with the energy-storing unit, and the operating mechanism in place.
Figure 2:
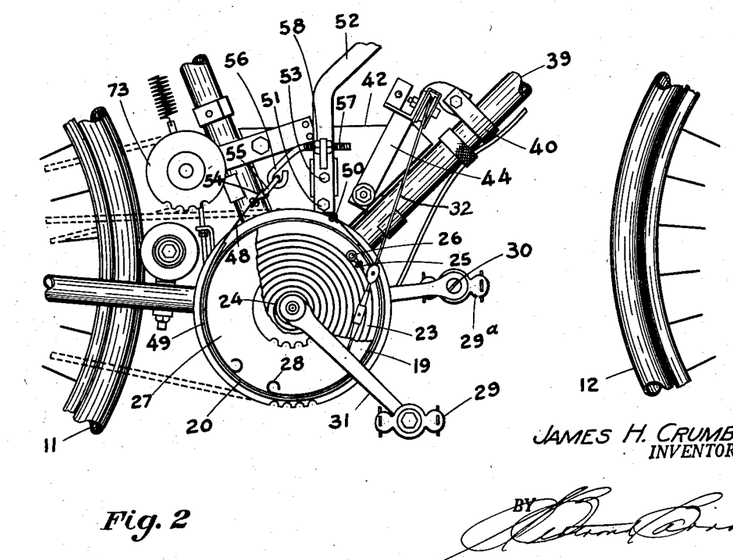
Fig. 2 is an enlarged side elevation of the spring drum, and the operating mechanism of the bicycle, shown in Fig. 1, with the spring drum cover partially removed.
Figure 3:
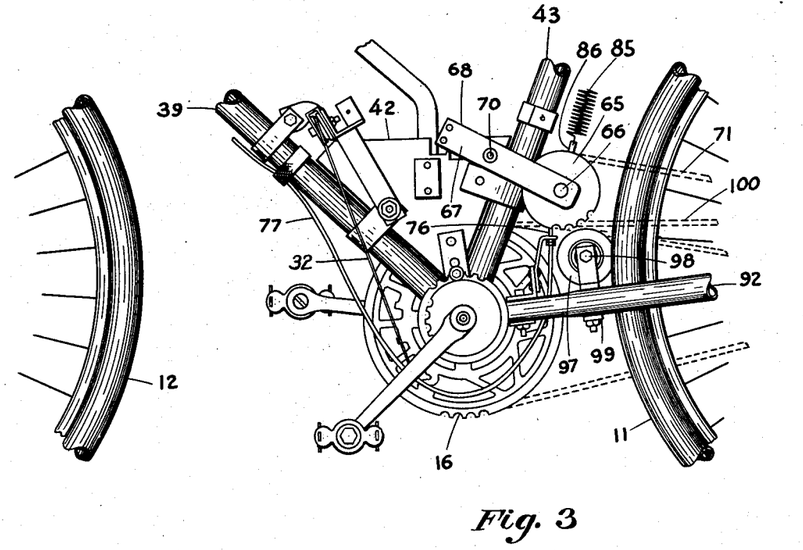
Fig. 3 is an enlarged side elevation of the opposite side of the operating mechanism, shown in Figs. 1 and 2.

The unit, shown in Figs. 1, 2 and 3, may be mounted on the conventional type of bicycle, comprising a frame 10, removably supporting a pair of wheels 11 and 12 at opposite ends thereof. The rear wheel 11 may be driven by a sprocket 14, attached to the hub thereof, the sprocket being connected by a roller chain 15, or other suitable type of chain, or transmission device, to a larger driving sprocket 16, centering on a pedal shaft 17, mounted at approximately the center of the frame, between the two wheels.

A spring drum 19, comprising a substantially tubular housing 20, and a rear plate 21, attached to, or formed integral with the housing, may be mounted on the pedal shaft, concentric with the driving sprocket 16, the center of the rear plate 21 being mounted on the pedal shaft, with the rear plate attached to the driving sprocket 16 by a plurality of screws, or other suitable attaching means.

A coiled torsion spring 23, formed of wide, thin strip spring steel, may be mounted within the spring drum, the edge 24 of the inner coil of the spring being welded, brazed, or otherwise attached to the pedal shaft 17, a loop 25, formed at the outer end of the outer coil of the spring, being attached to the drum housing 20, or the rear plate 21, thereof, by means of a pin 26, or other suitable attaching means, thus enabling the spring to rotate the spring drum and the driving sprocket attached thereto, when the spring is energized.

A substantially circular cover plate 27, may be removably fitted to the forward end of the interior of the drum housing, to enclose the spring, a snap ring 28, formed of wire, or other suitable latching device, being fitted into a groove formed in the inner diameter of the drum housing, to retain the cover plate in position.

A pair of pedals 29 and 29a may be trunnioned on shafts 30, attached to the outer ends of a pair of arms 31 and 31a, the inner ends of both of which are attached to the pedal shaft 17, the pedals being located at opposite sides of the frame 19, in the conventional position.

Figures 4, 5, 9, 10:
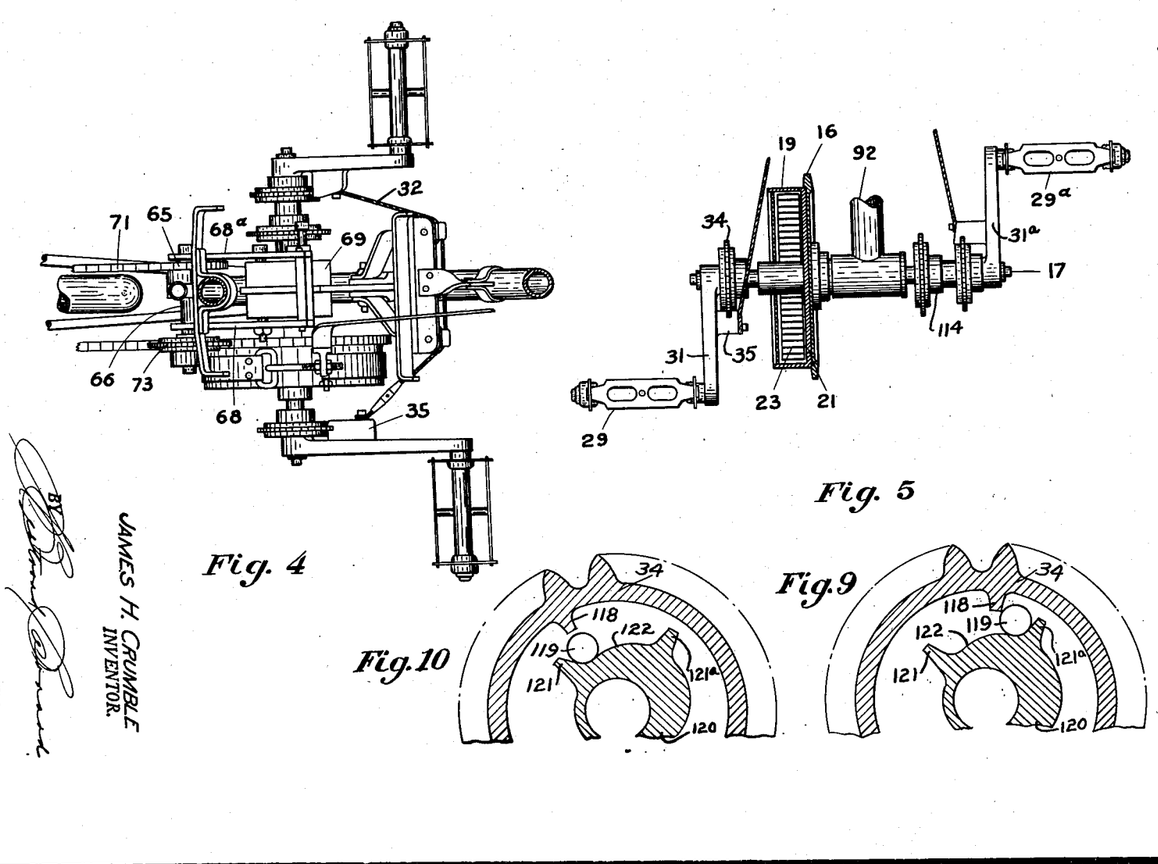
Fig. 4 is a plan view of the foot pedals, the spring drum, and the operating mechanism, shown in Figs. 1, 2 and 3, taken at 4—4, Fig. 1.
Fig. 5 is a vertical section through the spring drum, and a front elevation of the pedals and the operating mechanism, taken at 5—5, Fig. 1.
Fig. 9 is a vertical section through one of the pedal shaft sprockets, shown in Fig. 6, with a ratchet mechanism mounted in the interior of the sprocket hub, the ratchet mechanism being shown in the engaging position.
Fig. 10 is a section through the sprocket hub, shown in Fig. 1, with the sprocket rotation reversed, showing the ratchet mechanism in the releasing position.
Figures 6, 7, 8:
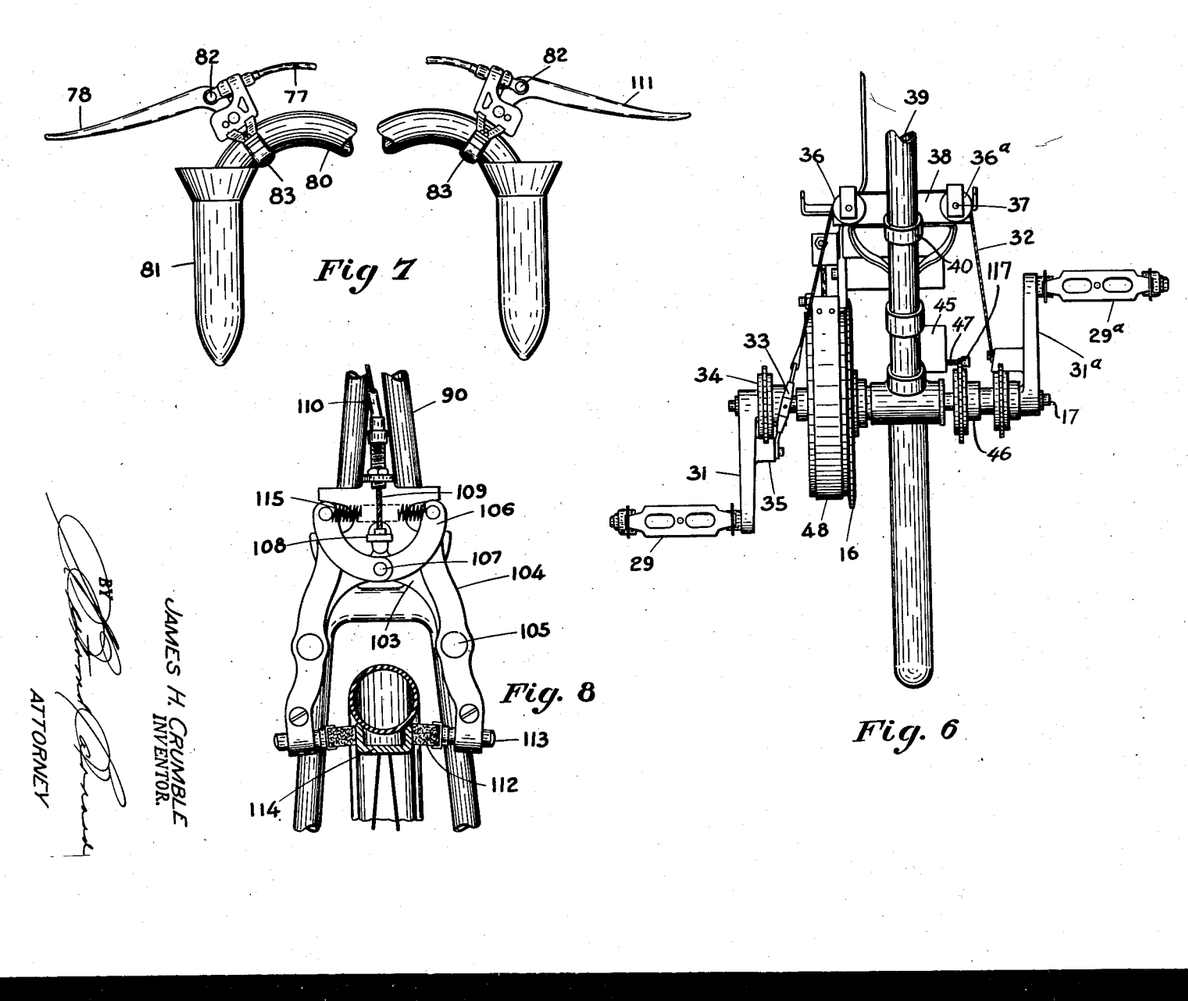
Fig. 6 is a front elevation of the pedals, and the pedal linkage, of Fig. 1, taken at 6—6, Fig. 1.
Fig. 7 is a plan view of the handle bars of the bicycle, showing the cable control levers, taken at 7—7, Fig. 1.
Fig. 8 is a section through the rim and tire of the rear wheel of the bicycle, shown in Fig. 1, and a rear elevation of the wheel braking mechanism, taken at 8—8, Fig. 1.

As indicated in Figs. 3, 4 and 6, the two pedals 29 and 29a, and the pedal support arms 31, on which they are mounted, may be linked to one another by a flexible cable 32, or other suitable flexible connecting means, the opposite ends of the cable being attached to the opposite pedal arms 31 by screws, or any other suitable attaching means, a turnbuckle 33, or other suitable form of adjustment, being provided at one or both ends of the cable to allow the angular movement of the pedals to be adjusted.

A sprocket hub 34, having a ratchet mounted in the interior thereof, may be mounted at each end of the pedal shaft, adjacent the pedal arms 31, the outer diameter of each of the hubs being connected to the corresponding arm by a pin or bar 35, welded or otherwise attached to the adjacent arm, thus causing the sprocket hub 34, to rotate with the pedal movement, when the pedal shaft is rotated in a clockwise direction, the ratchet allowing the pedal arms to rotate freely in the opposite direction.

As indicated in Fig. 6, a pair of pulleys 36 and 36a, may be trunnioned on pins 37, or other suitable supports, attached to a bracket 38, which is mounted adjacent the front angular frame member 39 of the bicycle, the bracket being supported on the frame member by a clamp 40, or other suitable support means.

A gusset plate 42 may be mounted at the junction between the front frame member 39, and the rear frame member 43, of the bicycle frame, a pair of formed brackets 44, being provided between the gusset plate 42, and the pulley support bracket 38, to reinforce the bracket. As indicated in Figure 6, a block 45 may be attached to the gusset plate 42. A sprocket hub 46, which in reality serves as a housing having one or more slots cut through the outer flange thereof, may be mounted on the pedal shaft 17, adjacent the tubular section of the frame which supports the shaft. A screw or pin 47, which fits one of the slots formed in the housing, or in the space between sprocket teeth may be threadably inserted in the gusset plate 42 to restrain the housing 46 from rotation, thereby preventing the torsion spring 23 from reversing the pedal shaft after the spring is wound up by the pedals, or by another method hereinafter described. A ratchet and pawl mechanism is mounted within the housing, allowing the pedal shaft to be rotated in one direction, but restraining it from accidental rotation in the opposite direction, thereby preventing the wound spring from acting on the pedal shaft.

The cable 32, guided by the two pulleys 36 and 36a, draws one of the pedal arms 31 upward when the opposite pedal arm 31a, is moved angularly downward in the driving position. In general, the pedal movement during the working stroke, starts at a point slightly beyond the vertical or top dead center position of the pedal arm, and continues until the pedal arm reaches an angle of approximately 30 degrees before the bottom dead center position of the pedal. In this manner, maximum utilization of the foot pressure of the operator is available at all times, for energizing the spring, as the foot is moved continuously downward from the start of the pedal movement at the upper position, to the end of the pedal movement, before the pedal reaches its lower dead center position, approximately full weight and pressure of the foot being available at all times.

As one pedal is moved on its downward, or energizing stroke, the opposite pedal is raised to the starting position, forward of the pedal arm dead center position, by the flexible cable 32, so that the opposite pedal is ready for its driving stroke, when the stroke of the other pedal is completed.

By starting the pedal movement, forward of the upper dead center position of the pedal arm, pressing against the pedal, while the arm is in its vertical, or dead center position, is avoided at all times.

A circumferential brake shoe 48, may be wrapped around the outer diameter of the drum housing, as indicated in Fig. 2, a lining 49, being attached to the inner surface of the shoe, to engage a major portion of the outer circumference of the drum in order to brake the rotation of the drum.

A loop 50, formed at one end of the brake shoe, may be attached by a pin or bolt 51, or other suitable attaching means, to the lower end of a brake lever 52, pivotally supported on a block attached to the gusset plate 42, by a screw 53, or pin, as indicated in Fig. 2.

A similar loop 54, formed at the opposite end of the brake shoe may be connected to the brake lever 52, by a link 55, pivotally attached to an adjustable eye bolt 56.

A threaded section 57, formed at the forward end of the eye-bolt 56, may be fitted through an opening formed in a boss, attached to the brake lever, above the pivot pin 53, a pair of nuts 58 clamping the threaded portion of the eye-bolt against the brake lever and providing an adjustment to control the braking pressure, when the control lever is moved into the braking position.

A latch 60, may be attached to the forward end of the horizontal frame member 61, the latch gripping the upper end, or handle 62, of the brake lever, to retain the brake lever in the braking position, when the handle is moved forward, thus wrapping the brake around the spring drum.

In order to release the brake, the handle is manually released from the latching bracket, and the brake lever moved rearward, thus releasing the drum brake, and allowing the drum and the sprocket attached thereto to rotate.

In normal operation, the brake shoe on the spring drum is locked, by moving the brake lever 52 forward and latching the handle in the latch 60.

The pedals 29 and 29a are then pressed alternately downward through the operating stroke, as hereinbefore described, the torsion spring 23 being wound while the spring drum is locked.

After the spring is wound, the drum brake may be released by unlatching the handle and moving the brake lever rearward.

The outer coil of the tightly wrapped spring rotates the drum 19 and the drive sprocket, attached thereto, in a clockwise direction, the chain rotating the rear wheel drive sprocket 14, in the same direction, thereby rotating the rear wheel 11, and propelling the bicycle forward.

After the energy, stored in the spring 23, has been exhausted, the momentum of the bicycle, and the rear wheel, thereof, continue the rotation of the rear wheel, and the forward movement of the bicycle, a ratchet, mounted within the wheel drive sprocket 14, attached to the rear wheel hub, allowing the wheel to rotate freely, without rotating the driving sprocket 16, attached to the spring drum, or the spring drum, thus relieving the load on the rear wheel, during this period.

As soon as the drum rotation stops, the drum brake lever 52, may again be moved into the braking position, the handle latched, and the spring again energized by the movement of the pedals 29 and 29a, and the rotation of the pedal shaft, as hereinbefore described.

In order to harness the force generated by the momentum of the bicycle in rolling downhill, to energize the spring, an auxiliary chain drive, shown in Figs. 1 and 3, may be provided.

The auxiliary drive comprises a sprocket 65, mounted on one end of a shaft 66, which is trunnioned in the open end of a substantially U-shaped lever 67, the side arms 68 and 68a, of which, are pivotally supported against a pair of spacers 69, attached to the gusset plate 42, by a bolt or screw 70, which fits through the spacers and the gusset plate, or by other suitable attaching means.

A roller chain 71 connects the auxiliary sprocket 65, to an auxiliary wheel sprocket 14a, attached to the hub of the rear wheel, concentric with the wheel drive sprocket 14, at the opposite side of the wheel.

A similar intermediate sprocket 73, having a ratchet located in the hub thereof, may be mounted on the opposite side of the sprocket shaft 66, adjacent the lever arm 68, the teeth of the sprocket, being in substantial alignment with the main drive chain 15.

The pivoted lever 67, may be controlled by a flexible cable or wire 76, mounted within a flexible sheath 77, or other suitable flexible control mechanism, one end of the cable being connected to the outer end of a control bell crank 78, pivotally attached to the one side of the handle bar 80, of the bicycle, adjacent the grip 81, by means of a pin 82, or other suitable form of pivot, supported at the lower end of a clamp 83, attached to the handle bar tube. The opposite end of the cable 76 may be connected to a collar, trunnioned on the auxiliary sprocket shaft 66, mounted at the forward end of the pivoted lever 67.

The shaft 66 and the pivoted lever 67, are normally retained in the upper position, shown in Fig. 1, by a coiled tension spring 85, the lower end of which may be connected by a link 86 to a collar, trunnioned on the shaft, with the looped upper end of the spring attached to a bracket 87, welded or otherwise attached to the rear frame member 43 of the bicycle, as indicated in Fig. 1.

The intermediate sprocket 73 is thus held out of engagement with the drive chain 15, until the control lever or bell crank 78, attached to one side of the handle bars of the bicycle is pressed against the handle bar grip, the flexible cable 76, drawing the pivoted lever 67 downward, until the sprocket 73 engages the main drive chain 15, as indicated in Fig. 3.

In this position, the rotation of the rear wheels, while the bicycle rolls downhill, drives the auxiliary chain 71 and the auxiliary sprocket 65, the sprocket 73 thus driving the main drive chain 15, thereby rotating the main drive sprocket, attached to the spring drum, thus rotating the spring drum 19, in a counterclockwise direction, the drum wrapping the outer coil of the spring around the pedal shaft, thereby energizing the spring, in substantially the same manner as it is energized by the pedal movement, hereinbefore described.

In order to maintain the auxiliary sprocket 73 in engagement with the main drive chain 15, it is necessary for the operator to press the control bell crank 78 against the handle bar, the flexible cable 76 attached to the bell crank, drawing the pivoted lever 67 downward against the pull of the tension spring 85.

The auxiliary sprocket is therefore in engagement with the drive chain to wind the spring in synchronism with the rotation of the rear wheel only during the period when it is held in that position by the operator.

The experience of the operator controlling the vehicle would indicate to him the length of time required to wind up the torsion spring 23 to the desired degree, which would be less than that required for fully winding it within the spring drum 19.

Before this point is reached, the operator releases the control bell crank 78, thereby allowing the tension spring 85 to draw the pivoted lever 68 upward, thereby drawing the auxiliary sprocket 73 out of engagement with the main drive chain 15, the torsion spring remaining in the wound condition until the operator releases the brake to enable the spring to control the drive sprocket and drive the rear wheels in the manner hereinbefore described.

With the auxiliary sprocket 73 out of engagement with the main drive chain 15, the bicycle would continue to coast downhill in the conventional manner, the torsion spring 23 remaining in the wound condition until the drum brake shoe 48 is released by releasing the brake lever 52 in the manner hereinbefore described.

Should the operator delay releasing the control bell crank until the spring is wound excessively, the loop 25 formed at the end of the outer coil of the spring would arrest the rotation of the drum, therefore causing the main drive chain to arrest the rotation of the rear wheel, thus tending to stop the forward movement of the bicycle.

The slipping of the tire of the rear wheels, when this condition is approached and the slowing down of the movement of the vehicle would serve as a signal to the operator to immediately release the control bell crank, thereby allowing the tension spring to raise the auxiliary sprocket out of engagement with the main drive chain, thereby arresting further winding of the torsion spring.

A ratchet, mounted in the hub of the rear wheel drive sprocket 14, allows the rear wheel to rotate in a clockwise direction, as a result of the downhill movement of the bicycle, the wheel drive sprocket 14 being rotated in the opposite direction, when the drive chain is driven by the intermediate sprocket 73.

The brake lever 52, may be moved into the braking position, and the handle 62 latched, before the bicycle reaches the bottom of the hill, in order to store up the energy in the spring. Before the brake lever 62 is applied, the control lever 78 on the handle bar is released, thereby allowing the tension spring 85 to raise the pivoted lever to its normal position shown in Fig. 1, with the intermediate sprockets 73 out of engagement with the drive chain 15. The energy stored in the torsion spring 23 may again be released when the brake lever is released, the spring drum, and the drum sprocket, driving the wheel drive sprocket, by means of the chain, thus propelling the rear wheel and the bicycle along level ground in the manner hereinbefore described.

The rear wheel 11 may be supported on the bicycle frame by an angular forked member 90, the upper end of which may be attached to the main frame members by a bolt 91, or other suitable attaching means, and a substantially horizontal forked member 92, the forward end of which rotatably supports the pedal shaft 17. A slot 93, may be cut through each of the angular brackets 94, connecting the ends of the forked members, the slots removably supporting a shaft 95, mounted at the center of the rear wheel hub, nuts 96 being threadably attached to the opposite sides of the shaft 95, to clamp the shaft against the sides of the brackets 94.

An idler roller 97, trunnioned on a shaft 98, supported by a bracket 99, attached to the lower frame forked member 92, may be provided, below the upper section 100, of the main drive chain 15, slightly rearward of the intermediate drive sprocket 73, to retain the intermediate sprocket 73 in engagement with the chain 15, when the pivoted sprocket lever is moved into its lower, or operating position.

A braking mechanism for independently braking the rear wheel, may be supported on a bracket 103, attached to the rear fork 90, of the bicycle, as indicated in Fig. 8.

The braking mechanism comprises a pair of side levers 104, each of which is pivotally attached to the bracket by means of a pin 105, the upper end of the levers being pivotally connected to a pair of arcuate links 106, which are connected at the center by a pin 107, which is, in turn, connected by a fitting 108, to one end of a flexible cable 109, supported within a flexible sheath 110, in substantially the same manner as the cable, controlling the pivoted lever 67.

The opposite end of the cable may be attached to the inner end of the long arm of a bell crank 111, pivotally supported at the opposite side of the handle bar 80, by a pin 82, supported at the lower end of a clamp 83, attached to the handle bar tube, as indicated in Fig. 7.

A brake block 112 may be adjustably attached to the lower end of each of the levers 104 by means of a pin 113, fitted into a clamp formed at the bottom of each of the levers. In the braking position, the brake blocks 112 engage the sides of the rim 114, of the rear wheel of the bicycle, thus arresting the rotation of the wheel. A coiled tension spring 115, may be connected between the upper ends of the levers 104 and the arcuate links 106, to retain the brake blocks in the open position. When the control lever, or bell-crank 111 is moved toward the handle bar, the cable 109 is drawn upward, thereby pivotally moving the lower end of the arcuate links 106 upward, and spreading the upper end of the side levers 104, thus moving the brake blocks 112, into engagement with the sides of the wheel rim, and braking the wheel.

As indicated in Figs. 5 and 6, a pedal shaft retaining sprocket hub 46, having a ball type ratchet release mechanism fitted thereto, the ratchet mechanism allowing the shaft to rotate in one direction, while preventing its rotation in the opposite direction, is mounted on and attached to the pedal shaft 17, between the frame and the sprocket 34 connected to the pedal arm 31a, opposite the drum 19, as indicated in detail in Fig. 6.

While shown as a sprocket in Fig. 6, the sprocket hub 46 acts primarily as a shaft arresting member, which allows the pedal arms to rotate the shaft in one direction, the ratchet mechanism preventing the rotation of the shaft in the opposite direction.

A block 45 is attached to the frame of the bicycle in the position indicated in Fig. 6, adjacent the sprocket hub 46, a screw 47, threadably inserted in the block 45, fitting into the groove formed between adjacent teeth 117 of the sprocket hub 46.

By preventing the rotation of the pedal shaft retaining sprocket hub 46 in the reverse direction, the screw 47 and the ratchet mechanism, mounted in the hub 46 allow the pedal shaft 17 to rotate in one direction, while preventing its rotation in the opposite direction, thus preventing the inner coil 24 of the torsion spring 23, which is attached to the shaft 17, from unwinding the spring, which is wound by means of the loop 25 in the outer coil, attached to the spring drum.

While shown as a sprocket in Fig. 6, a hub having a screw receiving yoke located at the outer circumference thereof, would serve essentially the same purpose, the hub being primarily a ratchet retaining hub, which engages the screw 47, attached to the block 45.

The drive unit may be attached to the conventional type of bicycle, the frame, wheels, and main drive sprocket being substantially the same as that on the conventional bicycle.

The spring drum, the auxiliary sprockets, the auxiliary chain, and the actuating mechanism therefor, may be bolted, or otherwise attached to the frame, and the rear wheel of the bicycle, respectively.

Figs. 9 and 10 represent sections through the sprocket hub 34, showing the ratchet mechanism mounted in the interior thereof, the ratchet mechanism being essentially the same as that used in the other sprockets, hereinbefore referred to.

When the sprocket 34 is rotated in a clockwise direction, Fig. 4, a depending tooth 118, integral with the inner circumference of the sprocket engages a ball or roller 119, located between the sprocket inner circumference and the ratchet hub 120, the ball engaging one of the teeth 121a, extending radially beyond the outer diameter of the ratchet hub, thereby rotating the ratchet hub and the shaft on which it is mounted.

When the rotation of the sprocket is reversed, the ball or roller 119 descends along the sprocket hub ramp 122 until the outer circumference of the roller clears the tooth 118 on the sprocket, thereby allowing the sprocket to rotate freely without disturbing the ratchet hub.

The unit may also be built as an integral part of the bicycle, the structural parts, supporting the unit, being welded, or otherwise attached to the bicycle frame members, in order to reduce the overall weight of the bicycle.

In place of the single coiled torsion spring mounted in the spring drum, an additional spring drum mounted on the opposite side of the frame, may be added, or an additional spring may be mounted in the same drum, to increase the spring tension and the propulsive force of the vehicle.

The method of supporting the auxiliary sprockets and the auxiliary chain may be altered to suit the requirements of a particular installation.

The external brake used on the spring drum, and the actuating lever, therefor, may be altered to suit special conditions encountered.

The outer diameter of spring drum and the width thereof, may be increased to accommodate a heavier spring, thereby increasing the propulsive force of the vehicle.

The angle of pedal movement may be varied, and the method of linking the pedals altered, to suit the requirements of particular installations.

The width of the spring drum may be reduced, and the pedal mounting and control mechanism shortened, in order to reduce the spacing between the pedals, and the overall width of the unit.

While the above description is generally confined to the use of the apparatus on the conventional type of two-wheeled bicycle, the same general construction, and power generating and transmission apparatus may be applied to three-wheeled, chain driven tricycles, small foot-propelled automobiles, small boats, or other types of vehicles.

The essentials of the spring drum and the drive and transmission mechanism would remain the same, the method of mounting, the supporting structure, the auxiliary drive, and the controls being altered to suit the requirements of the vehicle, on which the unit is used.

It will be apparent to those skilled in the art that my present invention is not limited to the specific details described above and shown in the drawings, and that various modifications are possible in carrying out the features of the invention without departing from the spirit and scope of the appended claims.

What I claim is:

1. A driving mechanism for a vehicle, having a frame and supporting wheels, with a pedal shaft rotatably supported by the frame, said shaft having pedalled cranks attached to the ends thereof, comprising a spring drum mounted on said pedal shaft, a coiled torsion spring mounted within said drum, one end of said spring being connected to the pedal shaft, with the opposite end attached to the drum, a chain drive sprocket attached to the drum, a wheel driving sprocket attached to one wheel of said vehicle, a chain operatively connecting said main drive and wheel driving sprockets, a flexible cable connecting said pedal cranks, means guiding said cable, said cable co-ordinating the movement of the cranks, and limiting the angular movement thereof, braking means mounted on said spring drum, means manually controlling said braking means, an auxiliary sprocket attached to said wheel, concentric with the wheel sprocket, an auxiliary drive sprocket mounted in substantial alignment with the wheel sprocket, a roller chain linking said auxiliary wheel sprocket and auxiliary drive sprocket, a pivoted lever having an auxiliary sprocket support shaft trunnioned at the free end thereof, rotatably supporting the auxiliary drive sprocket, a chain drive sprocket mounted on the opposite end of said auxiliary sprocket shaft, rotating with said auxiliary drive sprocket, manually operated cable controlled means lowering the pivoted lever to move said chain drive sprocket into engagement with the vehicle drive chain, the rotation of the pedal shaft energizing the spring, while the drum is braked, the free movement of the driving wheel independently energizing the torsion spring by means of the auxiliary wheel sprocket, the auxiliary drive sprocket connected thereto by an auxiliary chain, and the chain drive sprocket mounted on the auxiliary shaft, the release of the energy in the torsion spring, by releasing the braking means, driving the vehicle wheel, by means of the main drive sprocket and wheel driving sprocket driven thereby.

2. A vehicle having a frame and a set of supporting wheels, with a pedal shaft rotatably supported by the frame, said shaft having pedalled cranks attached to the ends thereof, a spring drum mounted on said shaft, a coiled torsion spring mounted within said drum, the inner end of said spring being connected to the pedal shaft, means connecting the opposite end to the drum, a drive sprocket attached to the drum, a wheel drive sprocket attached to one wheel of said vehicle, a chain operatively connecting said sprockets, flexible means connecting said pedal cranks to co-ordinate the movement of the cranks, and limit the angular movement thereof, braking means mounted on said spring drum, means manually controlling said braking means, an auxiliary sprocket attached to said wheel, concentric with the wheel sprocket, an auxiliary drive sprocket mounted in substantial alignment with the wheel sprocket, a roller chain linking said auxiliary wheel sprocket and auxiliary drive sprocket, a pivoted lever having an auxiliary sprocket support shaft trunnioned at the free end thereof, rotatably supporting the auxiliary drive sprocket, a chain drive sprocket mounted on the opposite end of said auxiliary sprocket shaft, rotating with said auxiliary drive sprocket, cable controlled means operable from the bicycle handle bar lowering said pivoted lever to move said chain drive sprocket into engagement with the vehicle drive chain, a collar trunnioned on said auxiliary shaft, a coiled tension spring connecting the collar to the vehicle frame, normally retaining the chain drive sprocket out of engagement with the driving chain, the rotation of the pedal shaft energizing the torsion spring, the free movement of the driving wheel independently energizing the spring by means of the auxiliary wheel sprocket, the auxiliary drive sprocket connected thereto by an auxiliary chain, and the chain drive sprocket mounted on the auxiliary shaft, the release of the energy in the torsion spring, by releasing the drum braking means, rotating the drum sprocket and the vehicle driving wheel.

3. A vehicle having a frame and a set of supporting wheels, with a pedal shaft rotatably supported by the frame, said shaft having pedalled cranks attached to the ends thereof, a spring drum mounted on said shaft, a coiled torsion spring mounted within said drum, the inner end of said spring being connected to the pedal shaft, with the opposite end attached to the drum, a drive sprocket attached to said drum, a wheel drive sprocket attached to one wheel of said vehicle, a chain operatively connecting said sprockets, a flexible element connecting said pedal cranks, means guiding said flexible element, said flexible element co-ordinating the movement of said cranks, and limiting the angular movement thereof, a brake shoe wrapped around said spring drum, a brake control level pivotally attached to the vehicle frame, the ends of said brake shoe being connected to said brake lever, at opposite sides of the pivot point, means latching said brake lever in the braking position, an auxiliary sprocket attached to said wheel, concentric with the wheel sprocket, an auxiliary drive sprocket mounted in substantial alignment with the auxiliary sprocket, a chain operatively connecting said sprockets, a pivoted lever having an auxiliary sprocket support shaft trunnioned at the free end thereof, rotatably supporting said auxiliary drive sprocket, a chain drive sprocket mounted on the opposite end of said auxiliary shaft, rotating with said auxiliary drive sprocket, means manually moving said chain drive sprocket into engagement with the vehicle drive chain, a collar trunnioned on said auxiliary shaft, a coiled tension spring connecting the collar to the vehicle frame, normally retaining the chain drive sprocket out of engagement with the driving chain, the rotation of the pedal shaft energizing the torsion spring, while the brake lever is in the braking position, the free movement of the driving wheel independently energizing the torsion spring by means of the auxiliary wheel sprocket, the auxiliary drive sprocket connected thereto by an auxiliary chain, and the chain drive sprocket mounted on the auxiliary shaft, the release of the torsion spring energy, by releasing the drum brake, rotating the drum sprocket and the vehicle driving wheel.

4. A vehicle having a frame and supporting wheels, with a pedal shaft rotatably supported by the frame, said shaft having pedalled cranks attached to the ends thereof, a spring drum mounted on said shaft, a coiled torsion spring mounted within said drum, the inner end of said spring being connected to the pedal shaft, means connecting the outer coil of the spring to the drum, a drive sprocket attached to said drum, a wheel drive sprocket attached to one wheel of the vehicle, a chain operatively connecting said sprockets, a flexible cable connecting said pedal cranks, said cable co-ordinating the movement of the cranks, and limiting the angular range thereof, a bracket attached to the frame, a plurality of pulleys rotatably mounted on said bracket, said pulleys guiding the cable, a brake shoe wrapped around the spring drum, a brake control lever pivotally attached to the vehicle frame, a loop formed at one end of the brake shoe pivotally attached to one end of the lever, an eyebolt attached to the opposite end of the brake shoe, adjustably connected to said lever, at the opposite side of the pivot point, means latching said brake lever in the braking position, an auxiliary sprocket attached to said wheel, concentric with the wheel sprocket, an auxiliary drive sprocket mounted in substantial alignment with the wheel sprocket, a roller chain linking said auxiliary wheel sprocket and auxiliary drive sprocket, a pivoted lever having an auxiliary sprocket support shaft trunnioned at the free end thereof, rotatably supporting the auxiliary drive sprocket, a chain drive sprocket mounted on the opposite end of said auxiliary sprocket shaft, rotating with said auxiliary drive sprocket, manually operated cable controlled means lowering the pivoted lever to move said chain drive sprocket into engagement with the vehicle drive chain, the rotation of the pedal shaft energizing the spring, while the brake lever is in the latched position, the free movement of the driving wheel independently energizing the torsion spring by means of the auxiliary wheel sprocket, the auxiliary drive sprocket connected thereto by an auxiliary chain, and the chain drive sprocket mounted on the auxiliary shaft, the release of the energy in the torsion spring, by releasing the brake lever, initiating the rotation of the drum sprocket and the vehicle driving wheel.

5. A vehicle having a frame and a set of supporting wheels, with a pedal shaft rotatably supported by the frame, said shaft having pedalled cranks attached to the ends thereof, a spring drum mounted on said shaft, a coiled torsion spring mounted within said drum, the inner coil of said spring being attached to the pedal shaft, means connecting the outer coil to the drum, a chain drive sprocket attached to the drum, a wheel driving sprocket attached to one wheel of said vehicle, a wheel driving sprocket ratchet, mounted within said sprocket, allowing the sprocket to rotate freely in one direction, a chain operatively connecting said sprockets, flexible means connecting said pedal cranks to co-ordinate the movement of said cranks, and limit the angular movement thereof, braking means mounted on said spring drum, means manually controlling said braking means, an auxiliary sprocket attached to said wheel, concentric with the wheel sprocket, an auxiliary drive sprocket mounted in substantial alignment with said wheel sprocket, a roller chain linking said auxiliary wheel sprocket and auxiliary drive sprocket, a pivoted lever having an auxiliary sprocket support shaft trunnioned at the free end thereof, rotatably supporting said auxiliary drive sprocket, a chain drive sprocket mounted on the opposite end of said auxiliary shaft, rotating with said auxiliary drive sprocket, a chain drive sprocket ratchet, mounted within the chain drive sprocket, allowing the sprocket to rotate freely in the reverse direction, means manually moving said chain drive sprocket into engagement with the vehicle drive chain, a collar trunnioned on said auxiliary shaft, a coiled tension spring connecting the collar to the vehicle frame, normally retaining the chain drive sprocket out of engagement with the driving chain, the rotation of the pedal shaft energizing the torsion spring, the free movement of the driving wheel independently energizing the torsion spring, when the auxiliary chain drive sprocket engages the bicycle drive chain, the release of the energy in the torsion spring, by releasing the drum braking means, initiating the rotation of the drum sprocket, and the vehicle driving wheel, the momentum of the wheel continuing the rotation thereof, the wheel driving sprocket ratchet allowing the wheel to rotate, without rotating the spring drum.

6. A bicycle having a frame and a pair of supporting wheels, with a pedal shaft rotatably supported by the frame, said shaft having pedalled cranks attached to the ends thereof, a spring drum mounted on said shaft, a coiled torsion spring mounted within said drum, the inner coil of said spring being attached to the pedal shaft, means connecting the outer coil of the spring to the drum, a drive sprocket attached to said drum, a wheel drive sprocket attached to one wheel of the bicycle, a chain operatively connecting said sprockets, a flexible element linking said pedal cranks, said flexible element co-ordinating the movement of the cranks, and limiting the angular range thereof, a bracket attached to the frame, a plurality of pulleys rotatably mounted on said bracket, said pulleys guiding the flexible element, a brake shoe wrapped around the spring drum, a brake control lever pivotally attached to the bicycle frame, a loop formed at one end of the brake shoe pivotally attached to one end of the lever, an eyebolt attached to the opposite end of the brake shoe, adjustably connected to said lever, at the opposite side of the pivot point, means attached to the frame, latching said brake lever in the braking position, an auxiliary sprocket attached to said wheel, concentric with the wheel sprocket, an auxiliary drive sprocket mounted in substantial alignment with the wheel sprocket, a roller chain linking said auxiliary wheel sprocket and auxiliary drive sprocket, a pivoted lever having an auxiliary sprocket support shaft trunnioned at the free end thereof, rotatably supporting the auxiliary drive sprocket, a chain drive sprocket mounted on the opposite end of said auxiliary drive sprocket shaft, rotating with said auxiliary drive sprocket, manually operated cable controlled means lowering the pivoted lever to move said chain drive sprocket into engagement with the vehicle drive chain, the rotation of the pedal shaft energizing the spring, while the brake lever is in the latched position, the free movement of the driving wheel independently energizing the torsion spring by means of the auxiliary wheel sprocket, the auxiliary drive sprocket connected thereto by an auxiliary chain, and the chain drive sprocket mounted on the auxiliary shaft, the release of the energy in the torsion spring, by releasing the brake lever, initiating the rotation of the drum sprocket and the bicycle driving wheel.

7. A bicycle having a frame and a pair of support-wheels, with a pedal shaft rotatably supported by the frame, said shaft having pedalled cranks attached to the ends thereof, a spring drum mounted on said shaft, a coiled torsion spring mounted within said drum, the inner coil of said spring being attached to the pedal shaft, with the outer coil connected to the drum, a drive sprocket attached to said drum, a wheel drive sprocket attached to one wheel of said bicycle, a roller chain operatively connecting said sprockets, a flexible element linking said pedal cranks, means guiding said flexible element, said flexible element co-ordinating the movement of the cranks, and limiting the angular movement thereof, braking means mounted on said spring drum, means manually controlling said braking means, means latching said braking control means in the braking position, an auxiliary sprocket attached to said wheel, concentric with the wheel sprocket, an auxiliary drive sprocket mounted in substantial alignment with said wheel sprocket, a roller chain operatively connecting said auxiliary and auxiliary drive sprockets, a pivoted lever having an auxiliary shaft trunnioned at the free end thereof, rotatably supporting said auxiliary drive sprocket, a chain drive sprocket, mounted on the opposite end of said auxiliary shaft, rotating with said auxiliary drive sprocket, mounted on said pivoted lever, cable controlled means operable from the bicycle handle bar, moving said pivoted lever, to move the chain drive sprocket into engagement with the bicycle driving chain, a collar trunnioned on said auxiliary shaft, a coiled tension spring connecting the collar to the vehicle frame, normally retaining the chain drive sprocket out of engagement with the driving chain, the rotation of the pedal shaft energizing the torsion spring, while the spring drum is braked, the free movement of the driving wheel independently energizing the spring, by means of the auxiliary wheel sprocket, the auxiliary drive sprocket connected thereto by an auxiliary chain, and the chain drive sprocket mounted on the auxiliary shaft, the release of the energy in the torsion spring, by releasing the drum braking means, initiating the rotation of the drum sprocket, and the bicycle driving wheel.

JAMES H. CRUMBLE.

References Cited in the file of this patent

UNITED STATES PATENTS

| Number | Name | Date |
|---|---|---|
| 683,037 | Wysocki | Sept. 24, 1901 |
| 1,217,260 | Zimmer | Feb. 27, 1917 |
| 2,277,391 | Crumble | Mar. 24, 1942 |
| 2,384,728 | Crumble | Sept. 11, 1945 |

FOREIGN PATENTS

| Number | Country | Date |
|---|---|---|
| 9,429 | Great Britain | Mar. 4, 1899 |
| 16,864 | Great Britain | July 4, 1912 |